(12) United States Patent
Maetschke

(10) Patent No.: US 6,414,261 B1
(45) Date of Patent: Jul. 2, 2002

(54) ANALYSIS OF WELD IMAGE TO DETERMINE WELD QUALITY

(75) Inventor: Stefan R. Maetschke, Unterrieden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/714,091

(22) Filed: Nov. 16, 2000

(51) Int. Cl.$^7$ ................................ B23K 11/25
(52) U.S. Cl. ...................... 219/109; 250/358.1
(58) Field of Search ................. 219/109, 110; 250/358.1; 374/124; 700/212

(56) References Cited

U.S. PATENT DOCUMENTS

| | | | | |
|---|---|---|---|---|
| 3,940,624 A | * | 2/1976 | Simmons | 250/358.1 |
| 4,083,223 A | * | 4/1978 | Hashimoto et al. | 374/124 |
| 4,854,724 A | * | 8/1989 | Adams et al. | 374/124 |
| 5,850,066 A | * | 12/1998 | Dew et al. | 219/109 |
| 5,968,376 A | * | 10/1999 | Shirk | 219/109 |
| 6,004,019 A | * | 12/1999 | Suita et al. | 364/477.06 |

OTHER PUBLICATIONS

Dave Utrata, Nondestructive Inspection of Spot Welds, Overview of a symposium held at the Center for Nondestructive Evaluation, Nov. 6, 1997, printed from Internet address: http://www.cnde.iastate.edu/idl/spot.html on Jul. 21, 2000, 15 pages.

Morphological Image Process, printed from Internet address: http://www.theimagingsource.com/adoculos/gb-book/ao–morph–8.1.1.htm on Aug. 8, 2000, 5 pages.

* cited by examiner

*Primary Examiner*—Clifford C. Shaw

(57) ABSTRACT

A system and method of determining the quality of a spot weld based on a set of image data includes separating the weld data from the background data and estimating a diameter of a weld (e.g., the nugget diameter of a spot weld) based on the weld data. The image data (e.g., a digital image) represents an image of the weld and includes weld data and background data. The estimation indicates the quality of the weld. In one embodiment, the surface brightness of the image data attributable to the spot weld is used to estimate the inner diameter of the spot weld.

17 Claims, 4 Drawing Sheets

ANALYSIS OF WELD IMAGE TO DETERMINE WELD QUALITY

FIELD OF THE INVENTION

The present invention relates generally to systems and methods for analyzing the quality of a weld. More specifically, the present invention relates to systems and methods for analyzing a weld image to determine the quality of the weld.

BACKGROUND OF THE INVENTION

Resistance welding techniques are used in many manufacturing processes, such as the automotive industry. Resistance welding techniques include spot, seam and projection welding. The exemplary embodiments of the present invention disclosed herein are particularly useful for spot welds, but may find applications in other resistance welding techniques and other manufacturing processes.

In spot welding, a nugget of weld metal is produced between two base metals at an electrode site. A coordinated application of electric current and mechanical pressure of the proper magnitudes and durations is needed to assure a suitable nugget is formed. For example, the current density and pressure must be high enough to form a nugget, but not so high that molten metal is expelled from the electrode site. Also, the duration of weld current must be sufficiently short to prevent excessive heating of the electrode faces.

Surface marking results from base metal shrinkage, caused by a combination of the heat of welding and electrode penetration into the surface of the base metal. The surface mark includes a circular ridge around a spot weld concavity centered around the nugget. The diameter of the nugget (called the "inner diameter" of the spot weld) must meet the requirements of the appropriate specifications or design criteria. For example, one specification requires that spot welds have a minimum nugget diameter of 3.5 to 4 times the thickness of the thinner base metal sheet.

One problem lies in estimating the inner diameter of the spot weld without pulling apart or otherwise destroying the weld. In the past, visual inspection by a human inspector has been used. However, this type of testing is inherently subjective, inconsistent, and labor-intensive. Ultrasonic inspection has also been implemented. However, this type of testing requires carefully applying an ultrasonic sensor to the weld, which requires time and precision. Ultrasonic inspection also requires complex signal analysis. Other types of testing include the hammer and chisel method, and detachment of the spot weld from the base metals. However, these two tests are destructive tests, and can only be performed on a few random samples.

Accordingly, there is a need for an improved system and method for determining the inner diameter of a spot weld to determine the quality of the weld. Further, there is a need for an improved system and method for non-destructively analyzing a weld. Further still, there is a need for a system and method for analyzing the quality of a plurality of welds quickly and efficiently in a manufacturing environment. Further yet, there is a need for a system and method for analyzing the quality of a weld which does not require determination of the center of the weld on the metal sheet prior to performing the analysis.

SUMMARY OF THE INVENTION

According to one exemplary embodiment, a method of determining a measure of the quality of a spot weld based on a set of image data representing an image of the spot weld includes identifying the image data into a first data set and a second data set, the first data set taken to be weld data and the second data set taken to be background data, and estimating an inner diameter of the spot weld based on the weld data. The image data includes weld data and background data. The estimation provides a measure of the quality of the weld.

According to another exemplary embodiment, a system for determining the quality of a weld includes a video camera and a computer program. The video camera is configured to acquire a set of image data representing an image of the weld. The computer program is embodied on a computer-readable medium and is configured to receive the image data, identify weld data in the image data, and estimate a diameter of the weld based on the weld data. The diameter of the weld indicates the quality of the weld.

According to yet another exemplary embodiment, a computer program for analyzing a set of image data representing an image of a weld includes means for separating the weld data from the background data and means for calculating the surface brightness of the spot weld based on the weld data. The image data includes weld data and background data. The surface brightness indicates the quality of the weld.

DETAILED DESCRIPTION OF EXEMPLARY EMBODIMENTS

Figure 1:
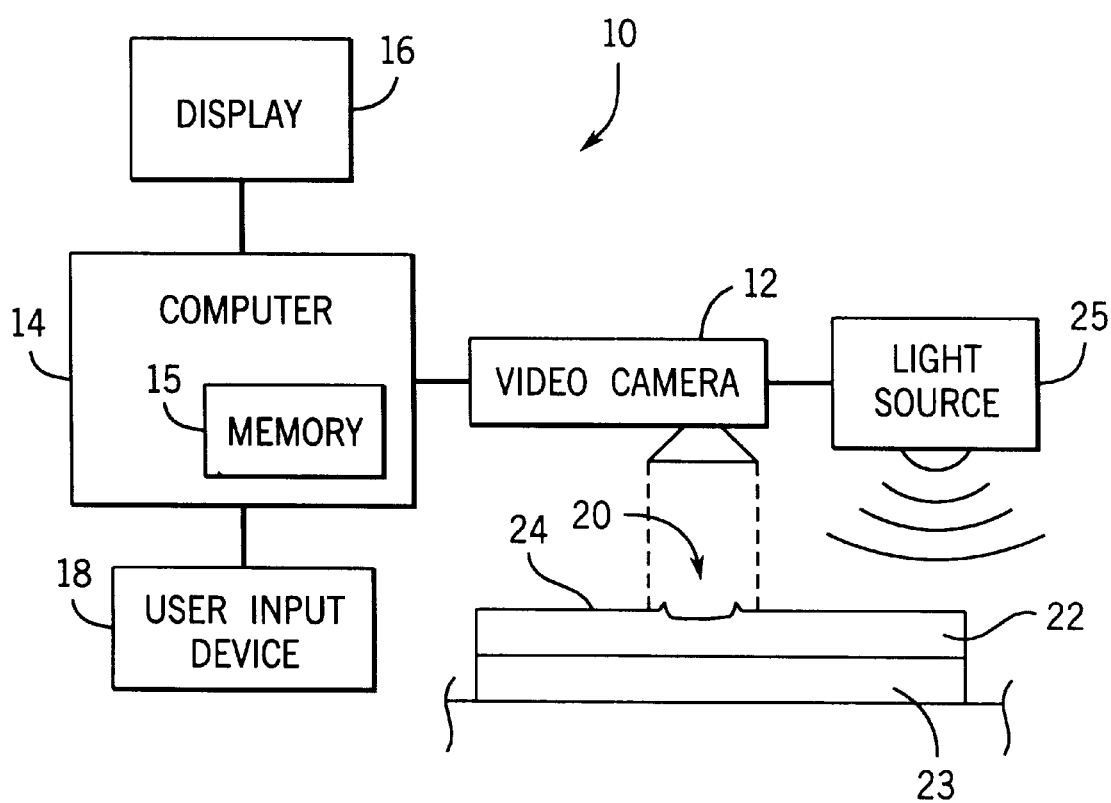
FIG. 1 is a block diagram of a system for analyzing a weld image to determine weld quality according to an exemplary embodiment.

Referring first to FIG. 1, a system 10 for analyzing a weld image to determine weld quality is shown. System 10 includes a video camera 12, a computer 14, having a memory 15, and, optionally, a display 16 and a user input device 18. System 10 is configured to acquire a digital image of a spot weld 20 which couples a first base metal 22 to a second base metal 23. System 10 is further configured to analyze the acquired image to determine the quality of the weld.

Video camera 12 is configured to acquire a digital image of weld 20, the digital image including image data comprising weld data (i.e. data attributable to the weld) and background data (i.e., data not attributable to the weld). A method of identifying the image data into a first data set, and a second data set will be described hereinbelow, wherein the first data set is taken to be weld data and the second data set is taken to be background data. Video camera 12 may be any type of video or image capturing device, such as, a digital camera or digital video camera. In this exemplary embodiment, a Sony Donpisha XC-8500CE digital black and white video camera, manufactured by Sony Electronics, Inc., San Jose, Calif., is utilized, although other cameras may also be used. Alternatively, a color digital video camera may be used. The acquired digital image represents spot weld 20 and a portion of an upper surface 24 of base metal 22. Optionally, a light source 26, such as a light bulb, image processing light, or other light source is provided in the vicinity of spot weld 20 to provide light in addition to the ambient light to upper surface 24 and spot weld 20, so that a better image may be acquired by video camera 12.

Video camera 12 is configured to provide a digital image file or digital image data to computer 14 for further processing. Computer 14 is any type of processor or signal processing device, such as, a microprocessor, a microcontroller, a laptop computer, a personal computer, a personal digital assistant, etc. Computer 14 includes the necessary memory 15 (e.g., random access memory, read-only memory, programmable read-only memory, a hard drive, a floppy disk, some combination thereof, etc.) for storing a software program suitable for operating the spot weld analysis steps described hereinbelow. Memory 15 is also suitable for storing data, such as, the digital image file or digital image data received from video camera 12. Computer 14 further includes input/output cards needed to communicate with display 16 and user input device 18. Display 16 may be any type of display for displaying digital image data, charts, text and other data to a human operator, and may be a cathode ray tube (CRT), a liquid crystal display (LCD), a touch-pad interface, etc. User input device 18 may be a keyboard, a mouse, or other user input device. Computer 14 is configured to process image data received from video camera 12 and provide results via display 16 or by saving the results to memory 15.

According to one alternative embodiment, video camera 12 may be configured to provide the digital image data via a network to computer 14 for further processing. The network may be any type of communication medium, such as, a local area network (LAN), a wide area network (WAN), an internet protocol network (e.g., an intranet, the Internet, etc.), or other network. Thus, video camera 12 may be configured with a network card suitable for communicating over the network to computer 14. Alternatively, video camera 12 may provide digital image data to a local computer, the local computer being configured with a network interface card suitable for communicating via the network with computer 14. In an embodiment where a local computer is used, some or all of the processing steps described hereinbelow may be performed on the local computer, with the remaining steps being performed by computer 14.

Figure 2A:
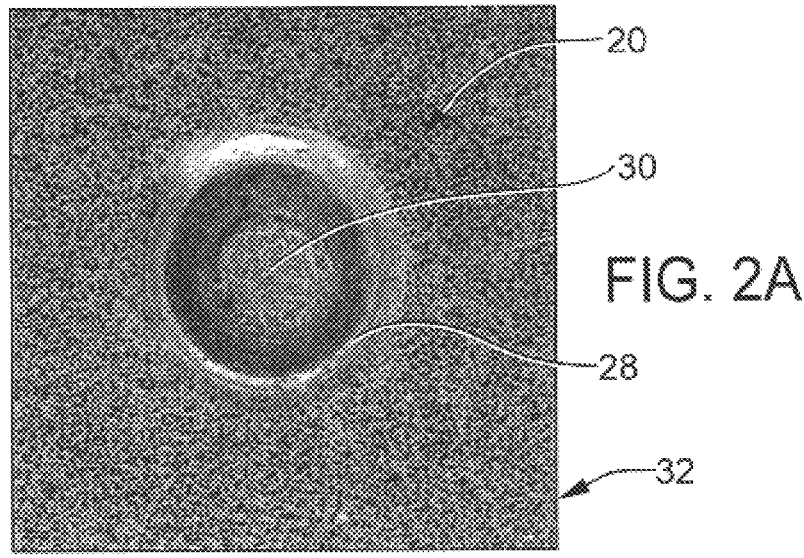
FIGS. 2A–2C are digital images showing a good spot weld (FIG. 2A), a fair spot weld (FIG. 2B), and a poor spot weld (FIG. 2C)
Figure 2B:
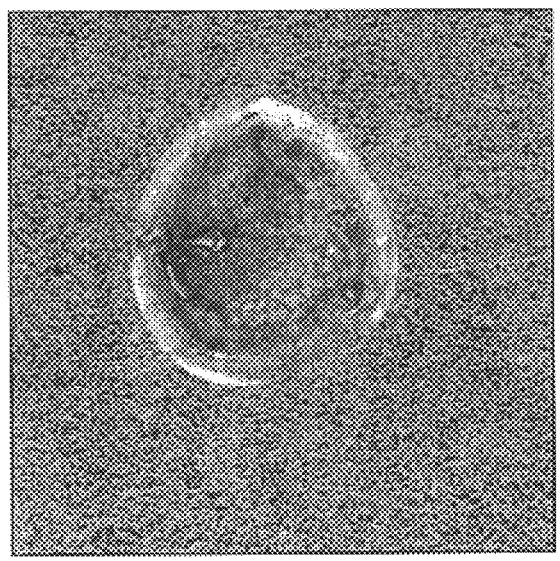
Figure 2C:
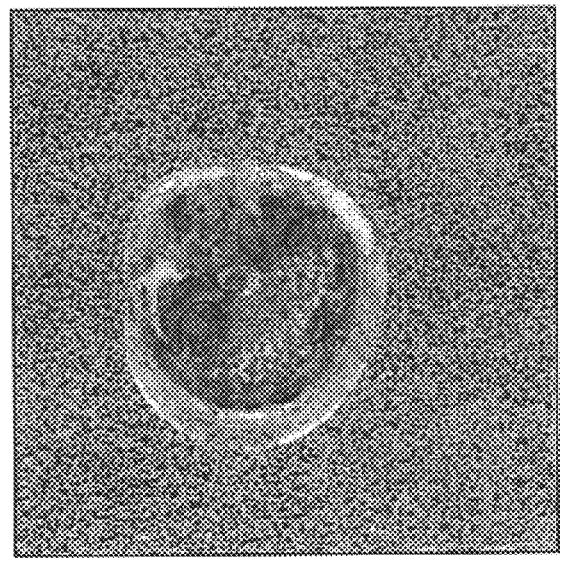

Referring now to FIGS. 2A–2C, these figures illustrate digital images of a good spot weld (FIG. 2A), a fair spot weld (FIG. 2B), and a poor spot weld (FIG. 2C). Using digital image 32 in FIG. 2A as an example, spot weld 20 includes an outer circular ridge 28 and a central portion 30 lying within outer circular ridge 28. Spot weld 20 further includes a nugget (not shown) having a diameter (called the "inner diameter" of the spot weld). The inner diameter of the spot weld indicates the quality of the spot weld. According to one advantageous aspect of this exemplary embodiment, it was discovered that although the inner diameter cannot be directly observed from the outer appearance of the spot weld, a good correlation exists between the inner diameter of the spot weld and the gray value distribution of the image pixels attributable to the spot weld in digital image 32. The gray value distribution of the spot weld provides a measure of the quality of the spot weld. Since the gray value distribution is given by the sum of gray values greater than the mean gray value (as will be described hereinbelow), the size and the darkness of the spot weld correlate well to the inner diameter. For example, the darker and bigger the spot weld, the larger the inner diameter, and the lighter and smaller the spot weld, the smaller the inner diameter. Thus, the surface brightness and the size of the spot weld have a good correlation to the inner diameter of the spot weld. This discovery will be illustrated by example hereinbelow.

Figure 3:
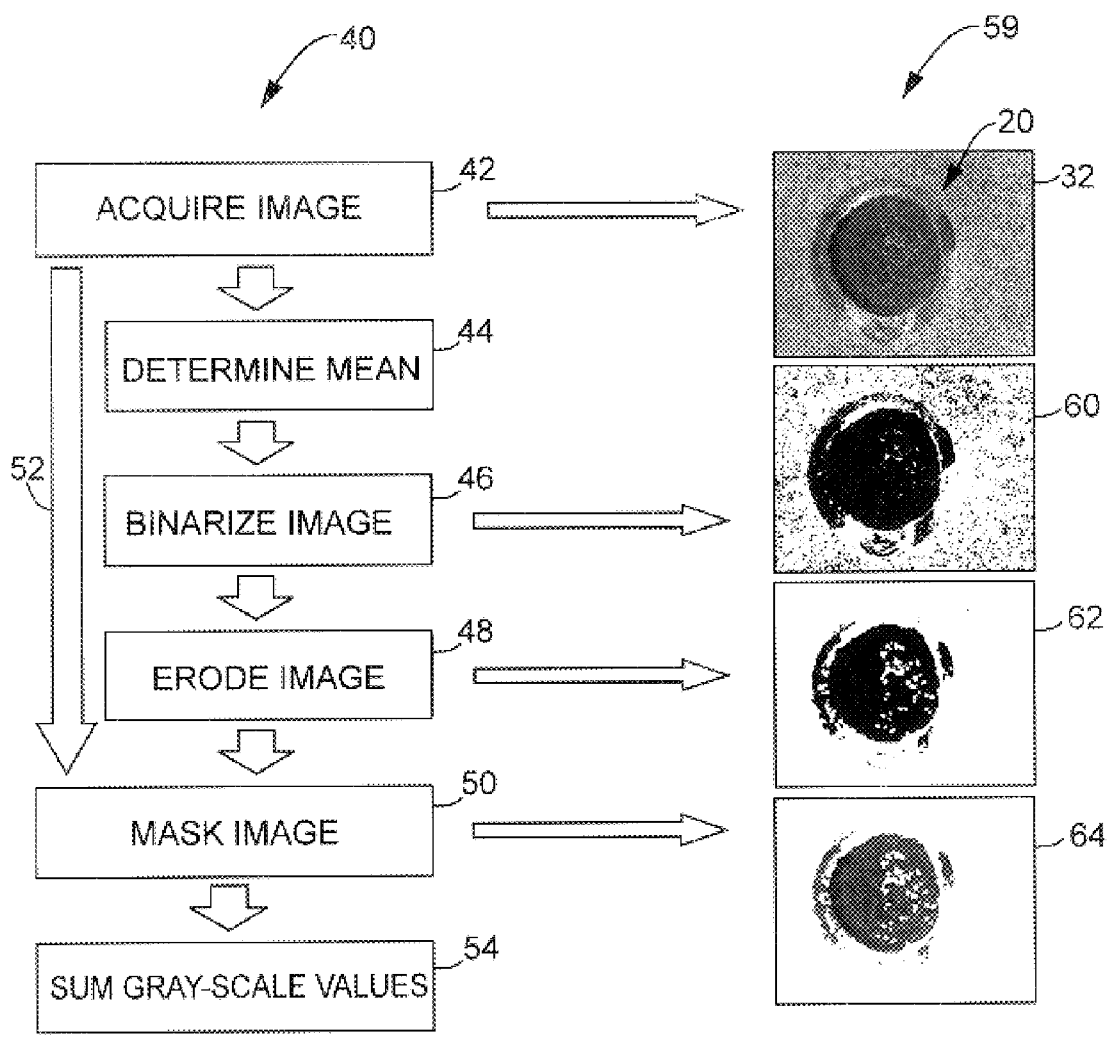
FIG. 3 is a flow chart illustrating a method for analyzing a weld image to determine weld quality according to an exemplary embodiment.

Referring now to FIG. 3, a method 40 of determining the quality of a spot weld based on a set of image data representing an image of the spot weld will now be described. FIG. 3 also shows a set of images 59 which illustrate the data sets at corresponding method steps. However, images 59 need not be actually displayed on display 16. Preferably, consistent parameterization of the process is maintained over multiple iterations, such as, consistent lighting, consistent distance between camera and weld, etc. A calibration step may be performed. At step 42, a digital image 32 of the spot weld 20 is acquired. Digital image 32 comprises pixel values $p(x,y)$, each pixel value having a gray-scale value associated therewith. Next, the image data is identified into a first data set and a second data set, the first data set taken to be weld data and the second data set taken to be background data. Any of a number of separating or identifying algorithms may be used. In this identifying step, the weld data need not be physically separated or separated into separate files in a storage medium. For example, identification may simply include associating an identifier with each image datapoint indicating whether it is attributable to the spot weld or the background. In this exemplary embodiment, the mean value m of all gray-scale values in pixels $p(x,y)$ is calculated at step 44. By determining the mean value m, the brightness of the image is also determined. At step 46, digital image 32 is binarized to generate binary image data $bp(x,y)$. To binarize the image, for each pixel $p(x,y)$, $bp(x,y)$ equals one if $p(x,y)$ is greater than the mean m and $bp(x,y)$ is equal to zero otherwise. The results of step 46 is illustrated in FIG. 3 when going from digital image 32, which includes the gray-scale values of all pixels $p(x,y)$ in the digital image file, to binarized image data 60, which displays a black dot where $bp(x,y)$ equals one and a white dot where $bp(x,y)$ equals zero.

At step 48, binary image data 60 is eroded using any of a number of erosion techniques. In this exemplary embodiment, a two-pass erosion with a window size of 3×3 is used to erode binary image data 60 to generate mask image data $ep(x,y)$ 62. Erosion is a known image processing technique by which a window is placed around each set of pixels within a set of digital image data and the center pixel of the window is a logical one (black) if all of the pixels in the window are also logical ones, and the center pixel of the window is a logical zero (white) if one or more of the pixels in the window are logical zero. Thus, windows of 5×5, 7×7, or other sizes may be used in the alternative. In this exemplary embodiment, a 2-pass erosion with a window size of 3×3 is used, though fewer or greater than two passes may be used depending upon the amount of "noise" in binary image data 60.

At step 50, the gray-scale values of the pixels remaining from erosion step 48 are made available (e.g., retrieved from memory), using the mask image 62. These gray-scale values are indicated by arrow 52, and are shown in FIG. 3 as image data set 64. Image data set 64 now contains primary weld data separated from the background data and indicates the gray-scale values.

At step 54, the gray-scale values for all pixels shown in image 64 are summed. This summation yields a value representative of the brightness and size of spot weld 20, which correlates relatively closely with the inner diameter of the weld nugget. An inner diameter can be estimated from the summation. A threshold value for the inner diameter can then be set or predetermined in order to differentiate between good and poor spot welds. Multiple threshold values can be set to differentiate between good, fair and poor spot welds.

In summary, by calculating binary image data bp(x,y) on the basis of the mean m, a coarse separation is obtained between background data and weld data. The subsequent 2-pass erosion (with a window size of 3×3) of the binary image data eliminates the remaining background pixels, resulting in mask image data ep(x,y). This mask image then gives access to the actual gray-scale values of the pixels of the spot weld. Simple summation of these gray-scale values yields a value that correlates relatively closely with the inner diameter of the weld nugget.

This method is simple and very robust. Further, it is not necessary to determine the center of the spot weld or the exact position or the size of the spot weld in the image in order to analyze complex reference characteristics. Further yet, scratches on base metal 22 usually appear as bright streaks and are automatically eliminated during the process of binarization and erosion, which renders them largely nonexistent as disturbances.

Figure 4:
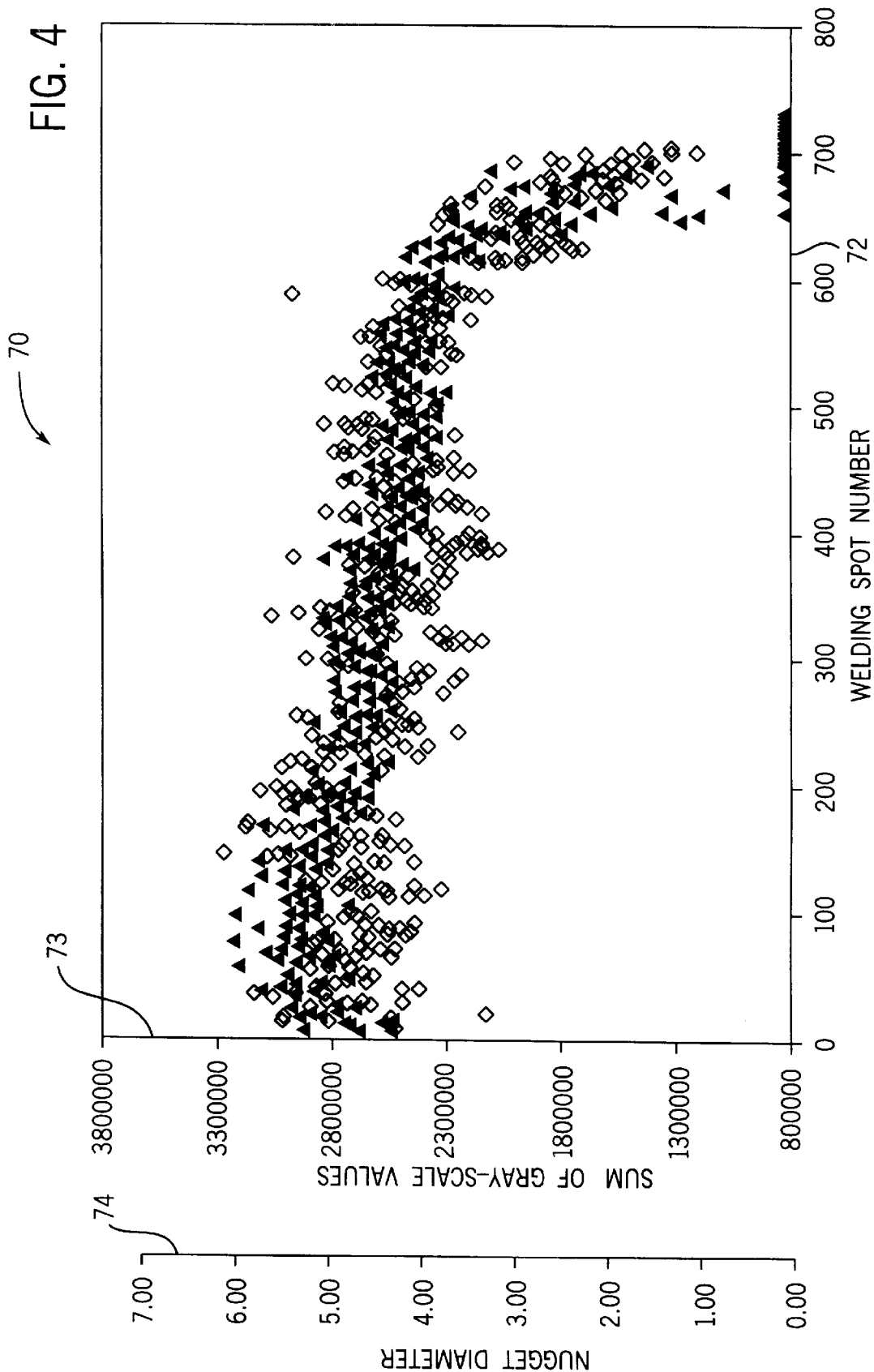
FIG. 4 is a scatter diagram illustrating the gray-scale values of the weld data according to a working example.

Referring now to FIG. 4, a scatter diagram according to an exemplary embodiment is shown. Method 40 (illustrated in FIG. 3) was run for approximately 700 spot welds, each spot weld being performed under similar welding conditions (i.e., pressure, current, etc.) and with the same electrodes. Each spot weld was then split and the inner diameter was measured with a ruler. Scatter diagram 70 has an x-axis 72 representing the number of an individual spot weld. The diamonds represent the sum of gray-scale values for each spot weld. The shaded triangles represent the measured nugget diameter of each spot weld. A first y-axis 73 indicates the gray-scale value sum, and a second y-axis 74 indicates corresponding nugget diameter.

Scatter diagram 70 indicates a close relationship between the nugget diameter and the sum of gray-scale values. Diagram 70 also illustrates the degradation of the spot welding electrodes after a given number of spot welds are formed. According to one advantage, a nugget diameter threshold can be set below which the electrodes must be replaced. For example, if one or a predetermined number of gray-scale values indicate a nugget diameter below 4.0 millimeters, computer 14 can signal an operator to change the electrodes.

The correlation coefficient between nugget diameter and the gray-scale value was calculated to be 0.820. The following equation was utilized to calculate the correlation coefficient ($v_{x,y}$):

$$v_{xy} = \frac{\sum (x_i - \bar{x})(y_i - \bar{y})}{\sqrt{\sum (x_i - \bar{x})^2 \cdot \sum (y_i - \bar{y})^2}}$$

where $\bar{x}, \bar{y}$ are the mean values, for example:

$$\bar{x} = \frac{1}{n}\sum_{i=1}^{n} x_i$$

and $x_i$=gray scale values, and $y_i$=inner diameter.

While the exemplary embodiments illustrated in the FIGS. and described above are presently preferred, it should be understood that these embodiments are offered by way of example only. For example, other methods may be used to separate the weld data from the background data. Further, the methods disclosed herein may be used for other applications in which the brightness or size of pixel areas associated with a digital image are useful in detecting a characteristic of the system. Also, not all of the steps of the exemplary embodiments need be performed in all embodiments, nor need they be performed in the specific order recited. Accordingly, the present invention is not limited to a particular embodiment, but extends to various modifications that nevertheless fall within the scope of the appended claims.

What is claimed is:

1. A method of determining a measure of the quality of a spot weld based on a set of image data representing an image of the spot weld, wherein the image data includes weld data and background data, comprising:

identifying the image data into a first data set and a second data set, the first data set taken to be weld data and the second data set taken to be background data;

estimating an inner diameter of the spot weld based on the weld data, whereby the estimation provides a measure of the quality of the spot weld; wherein, the image data include gray-scale values;

wherein, the step of estimating includes calculating the surface brightness and size of the spot weld based on the weld data; and wherein the step of calculating includes summing the gray-scale values associated with the weld data.

2. The method of claim 1, further comprising acquiring the image data using a digital video camera.

3. The method of claim 1, further comprising providing the image data across an internet protocol network.

4. A method of determining a measure of the quality of a spot weld based on a set of image data representing an image of the spot weld, wherein the image data includes weld data and background data, comprising:

identifying the image data into a first data set and a second data set, the first data set taken to be weld data and the second data set taken to be background data;

estimating an inner diameter of the spot weld based on the weld data, whereby the estimation provides a measure of the quality of the spot weld; wherein, the image data include gray-scale values; wherein, the step of identifying includes:

determining the mean gray-scale value of the image data;

comparing the gray-scale of each image data to the mean gray-scale value;

identifying each image data into the first data set or the second data set based on the comparison;

generating binary image data based on the image data, wherein the binary image data indicates a first binary logical value if the gray-scale of the image data is above the mean gray-scale value and the binary image data indicates a second binary logical value if the gray-scale of the image data is below the mean gray-scale value; and eroding the binary image in at least two passes.

5. The method of claim 4, wherein the step of eroding generates mask image data, further comprising summing the gray-scale values of the mask image data to estimate the inner diameter of the spot weld.

6. A system for determining the quality of a weld, comprising:

a video camera configured to acquire a set of image data representing an image of the weld;

a computer program embodied on a computer-readable medium, wherein the computer program is configured to receive the image data, identify weld data in the image data, and estimate a diameter of the weld based on the weld data, whereby the diameter of the weld indicates the quality of the weld;wherein the image data include gray-scale values; and wherein the computer program is configured to estimate the diameter of the weld by summing the gray-scale values associated with the weld data.

7. The system of claim 6, wherein the diameter is an inner diameter of a spot weld.

8. The system of claim 6, wherein the video camera is a digital video camera configured to acquire a set of digital image data.

9. The system of claim 6, wherein the computer program is configured to determine the mean gray-scale value of the image data, compare the gray-scale of each image data to the mean gray-scale value, and identify each image data as weld data or background based on the comparison.

10. The system of claim 6, wherein the computer program is configured to generate display data representative of the quality of the weld.

11. The system of claim 6, wherein the computer program is operable on a computer in communication with the video camera across an internet protocol network.

12. A system for determining the quality of a weld, comprising:

a video camera configured to acquire a set of image data representing an image of the weld;

a computer program embodied on a computer-readable medium, wherein the computer program is configured to receive the image data, identify weld data in the image data, and estimate a diameter of the weld based on the weld data, whereby the diameter of the weld indicates the quality of the weld;

wherein, the image data include gray-scale values;

wherein, the computer program is configured to determine the mean gray-scale value of the image data, compare the gray-scale of each image data to the mean gray-scale value, and identify each image data as weld data or background based on the comparison; and wherein the computer program is configured to generate a binary image of the image data based on the comparison, wherein the binary image indicates a logical 1 if the gray-scale of the image data is above the mean gray-scale value and a logical 0 if the gray-scale of the image data is below the mean gray-scale value, wherein the computer program is configured to generate eroded image data based on the binary image, wherein the eroded image data includes remaining data points, and wherein the computer program is configured to sum the gray-scales of the remaining data points, whereby the sum is representative of the diameter of the weld.

13. The computer program embodied on a computer-readable medium for analyzing a set of image data representing an image of a weld, wherein the image data includes weld data and background data, comprising:

means for separating the weld data from the background data; and means for calculating the surface brightness of the spot weld based on the weld data, whereby the surface brightness indicates the quality of the weld;

Wherein, the means for calculating includes means for estimating an inner diameter of the spot weld based on the weld data; and wherein the means for calculating includes means for summing gray-scale values associated with the weld data.

14. The computer program of claim 13, wherein the means for separating includes:

means for determining the mean gray-scale value of the image data;

means for comparing the gray-scale of each image data to the mean gray-scale value; and means for identifying each image data as weld data or background data based on the comparison.

15. A computer program embodied on a computer-readable medium for analyzing a set of image data representing an image of a weld, wherein the image data includes weld data and background data, comprising:

means for separating the weld data from the background data;

means for calculating the surface brightness of the spot weld based on the weld data, whereby the surface brightness indicates the quality of the weld;

wherein, the means for separating includes:

means for determining the mean gray-scale value of the image data;

means for comparing the gray-scale of each image data to the mean gray-scale value;

means for identifying each image data as weld data or background data based on the comparison;

wherein the means for identifying includes:

means for generating binary image data based on the image data, wherein the binary image data indicates a logical 1 if the gray-scale of the image data is above the mean gray-scale value and a logical 0 if the gray-scale of the image data is below the mean gray-scale value; and means for eroding the binary image in two passes.

16. The computer program of claim 15, wherein the means for eroding generates a mask image, further comprising means for summing the gray-scale values of the masked image to estimate the inner diameter of the spot weld.

17. The computer program of claim 15, further comprising means for receiving the image data from an internet protocol network.

* * * * *